(12) United States Patent
Shen et al.

(10) Patent No.: US 10,683,965 B2
(45) Date of Patent: Jun. 16, 2020

(54) SUPPORT ASSEMBLY FOR MOUNTING STRUCTURES ONTO VERTICALLY DISPOSED OBJECTS INCLUDING TELEVISIONS AND VIDEO MONITORS

(71) Applicant: Suncraft Solutions, Inc., Pomona, CA (US)

(72) Inventors: Donald Shen, Guangzhou (CN); Michael Roach, Libertyville, IL (US); James Zhao, Shanghai (CN)

(73) Assignee: Suncraft Solutions, Inc., Pomona, CA (US)

( * ) Notice: Subject to any disclaimer, the term of this patent is extended or adjusted under 35 U.S.C. 154(b) by 0 days.

(21) Appl. No.: 16/551,231

(22) Filed: Aug. 26, 2019

(65) Prior Publication Data
US 2019/0376645 A1    Dec. 12, 2019

Related U.S. Application Data

(63) Continuation of application No. 16/119,300, filed on Aug. 31, 2018, now Pat. No. 10,393,310, which is a continuation of application No. 14/588,768, filed on Jan. 2, 2015, now Pat. No. 10,066,783.

(51) Int. Cl.
*F16M 13/02* (2006.01)
*A47B 21/03* (2006.01)

(52) U.S. Cl.
CPC ....... *F16M 13/022* (2013.01); *A47B 21/0314* (2013.01)

(58) Field of Classification Search
CPC .. F16M 13/022; A47B 21/0314; A47B 97/00; A47B 96/07; A47B 96/061; A47B 57/045; A47B 2200/0089; A47B 31/06; A47B 2097/005
See application file for complete search history.

(56) References Cited

U.S. PATENT DOCUMENTS 1,666,084 A * 4/1928 Bright .................. A47B 96/061
108/11
1,738,415 A * 12/1929 Wittlinger .............. A47B 31/06
108/47
2,127,721 A * 8/1938 Erickson .............. A47B 57/045
108/3

(Continued)

OTHER PUBLICATIONS

Design U.S. Appl. No. 29/513,619 entitled: Support Assembly for Vertically Disposed Objects, Such as Televisions and Video Monitors; filed Jan. 2, 2015.

*Primary Examiner* — Hanh V Tran
(74) *Attorney, Agent, or Firm* — K&L Gates LLP

(57) ABSTRACT

A support assembly includes (i) a stand having an underside surface configured to be placed on top of a flat screen device and an upper surface configured to support at least one object; (ii) a mount secured to the underside surface of the stand, the mount presenting a first ratchet ring; (iii) an arm presenting a second ratchet ring; (iv) a fastener positioned and arranged to connect the arm to the mount, causing the first ratchet ring to engage the second ratchet ring, setting the arm at an angle so that a free end of the arm engages the flat screen device while the stand extends at least substantially horizontally from the top of the flat screen device; and (v) wherein the mount is threaded to threadingly engage the fastener.

23 Claims, 8 Drawing Sheets

(56) References Cited

U.S. PATENT DOCUMENTS

| | | | | |
|---|---|---|---|---|
| 2,328,069 A * | 8/1943 | Kurtz | A63C 11/02 | 280/815 |
| 2,410,088 A * | 10/1946 | Lundquist | A47C 1/027 | 403/97 |
| 4,614,452 A * | 9/1986 | Wang | F16B 7/04 | 403/146 |
| 4,858,796 A * | 8/1989 | Roth | B60N 3/002 | 224/482 |
| 5,074,448 A * | 12/1991 | Wu | A63B 71/0672 | 224/274 |
| 5,452,875 A * | 9/1995 | Kern | A47B 57/045 | 108/108 |
| 5,584,253 A * | 12/1996 | Stranford | A47B 23/02 | 108/42 |
| 5,826,908 A * | 10/1998 | McBride | A63C 11/028 | 280/814 |
| 5,827,005 A * | 10/1998 | Liu | F16B 7/0493 | 403/322.1 |
| 5,842,423 A * | 12/1998 | Stranford | A47B 21/0314 | 108/42 |
| 6,032,589 A * | 3/2000 | Wang | F16M 7/00 | 108/147.11 |
| 6,138,966 A * | 10/2000 | Smith | G11B 33/02 | 108/43 |
| 6,170,408 B1 * | 1/2001 | Gombrich | F16M 11/10 | 108/145 |
| 6,257,668 B1 * | 7/2001 | Chou | A47C 1/03 | 297/411.32 |
| 6,317,930 B1 * | 11/2001 | Hung | B25F 5/026 | 16/430 |
| 6,450,517 B1 * | 9/2002 | Lee | B62K 3/002 | 16/429 |
| 6,738,094 B1 * | 5/2004 | Minami | H04N 5/2251 | 248/166 |
| 6,773,060 B2 * | 8/2004 | Sher | A47B 21/0314 | 248/918 |
| 7,341,235 B2 * | 3/2008 | Okamoto | F16M 11/10 | 248/121 |
| 8,091,844 B1 * | 1/2012 | Bragg | F24F 13/32 | 248/208 |
| 8,146,879 B2 * | 4/2012 | Liao | A45B 11/00 | 248/514 |
| 8,528,870 B2 * | 9/2013 | Liu | B23D 47/025 | 144/286.5 |
| 8,584,998 B1 * | 11/2013 | Peterson | F24F 13/32 | 182/62 |
| 8,979,045 B2 * | 3/2015 | Petrakis | A47B 83/04 | 248/205.1 |
| D733,158 S | 6/2015 | Kardach | | |
| 9,534,628 B1 * | 1/2017 | Wang | F16C 11/10 | |
| 2003/0189150 A1 * | 10/2003 | Schultz | B63B 35/7946 | 248/316.2 |
| 2004/0179891 A1 * | 9/2004 | Watkins | F16C 11/10 | 403/96 |
| 2006/0175500 A1 | 8/2006 | Liu | | |
| 2006/0238662 A1 * | 10/2006 | McGivern | A47B 81/061 | 348/836 |
| 2008/0121771 A1 * | 5/2008 | Sen | E03C 1/06 | 248/229.11 |
| 2009/0008349 A1 * | 1/2009 | Kim | G06F 1/1607 | 211/150 |
| 2009/0224122 A1 * | 9/2009 | Liao | B60R 11/0252 | 248/292.13 |
| 2010/0044324 A1 * | 2/2010 | Gerace | A47B 81/061 | 211/26.2 |
| 2010/0258690 A1 * | 10/2010 | Kleitsch | A61M 5/1417 | 248/219.4 |
| 2015/0135998 A1 * | 5/2015 | Barsch | G06F 1/1607 | 108/42 |
| 2015/0296984 A1 * | 10/2015 | Fan | A47B 97/00 | 108/42 |

* cited by examiner

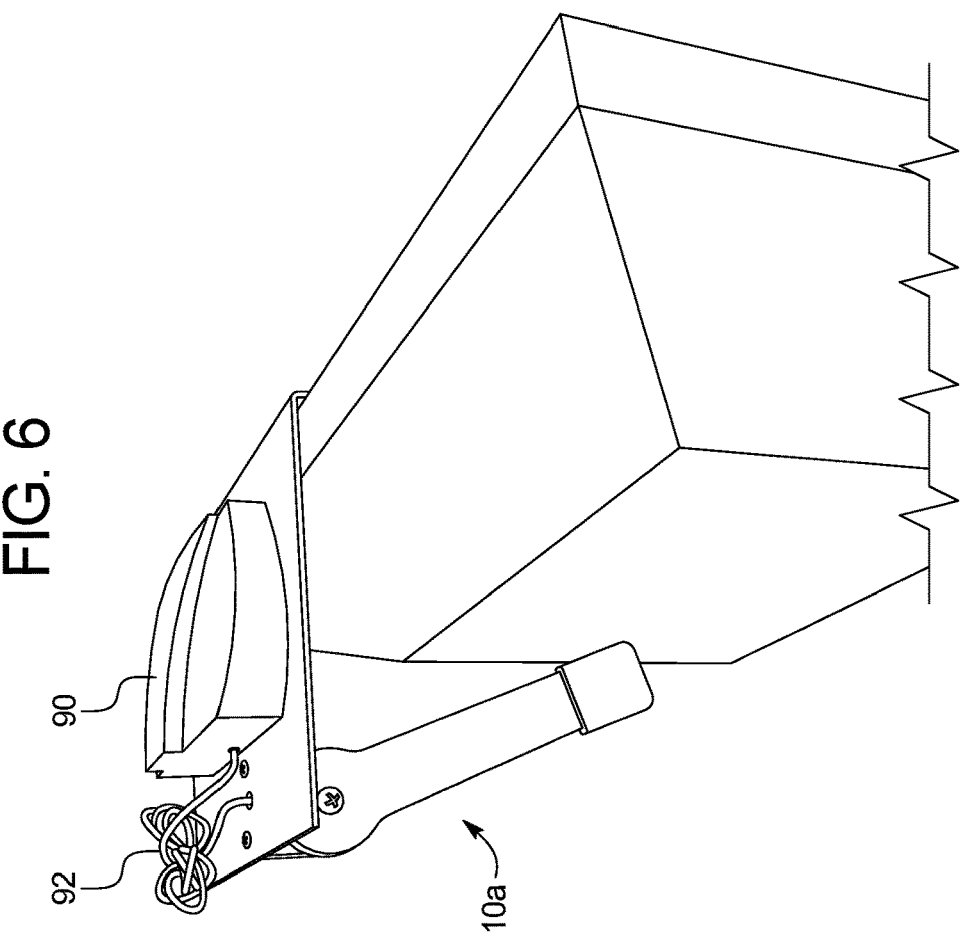
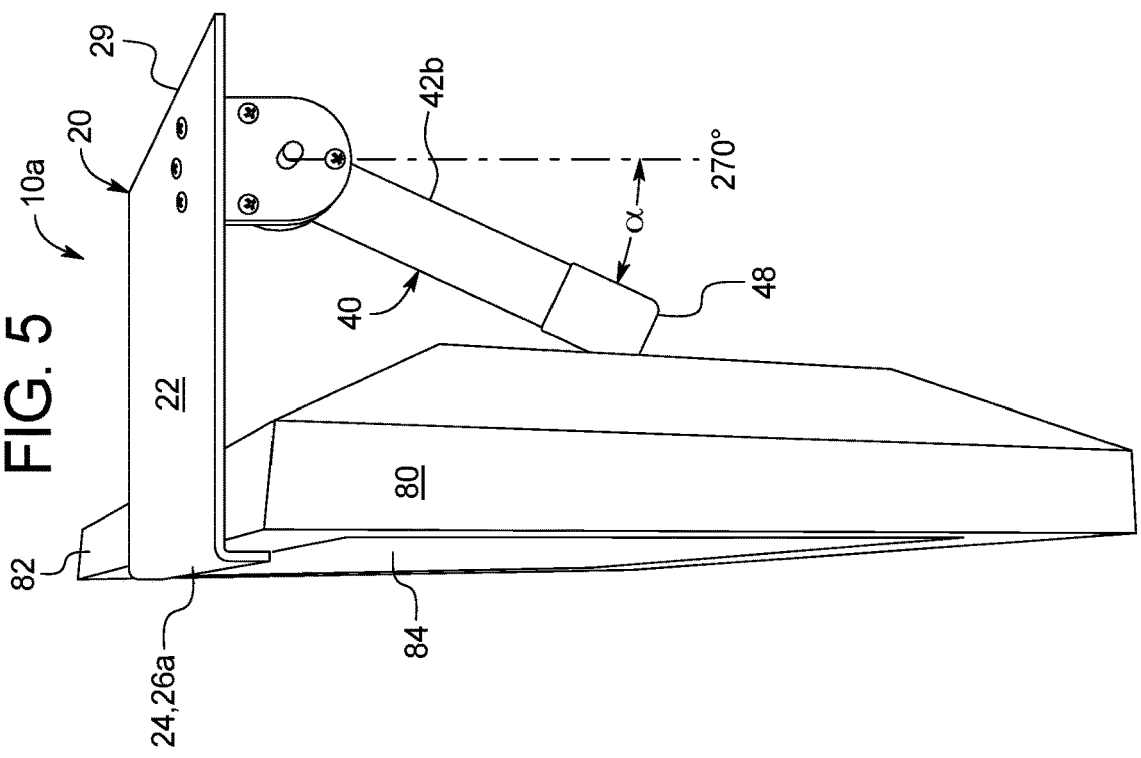

SUPPORT ASSEMBLY FOR MOUNTING STRUCTURES ONTO VERTICALLY DISPOSED OBJECTS INCLUDING TELEVISIONS AND VIDEO MONITORS

PRIORITY CLAIM

The present application claims priority to and the benefit as a continuation application of U.S. patent application Ser. No. 16/119,300, entitled "Support Assembly Mountable On Vertically Disposed Objects, Such as Televisions and Video Monitors", filed Aug. 31, 2018, which claims priority to and the benefit as a continuation application of U.S. patent application Ser. No. 14/588,768, issued as U.S. Pat. No. 10,066,783, entitled "Support Assembly For Vertically Disposed Objects, Such As Televisions and Video Monitors", filed Jan. 2, 2015, issued Sep. 4, 2018, the entire contents of each of which are incorporated herein by reference and relied upon in its entirety.

BACKGROUND

The present disclosure relates generally to stands or shelving. More specifically, the present disclosure relates to a stand or shelf for vertically disposed objects, such as televisions and video monitors.

The use of flat screen televisions is ever-increasing. Seemingly all new televisions will eventually be flat screens. Flat screen technology has also become standard for computer monitors. Moreover, flat screen technology has become very pervasive in the workplace, including individual work stations sometimes employing multiple computer monitors, large video monitors for meetings and conference calls, and video conferencing.

Older televisions often had a flat horizontal top surface. The flat top surface was often used to place and house pictures, television remote controls, ornaments and the like. The flat top surface was very convenient because it sat directly above the typical focal point of the room, namely, the television screen. Flat screen televisions and video monitors, by definition, do not have flat horizontal top surfaces. Flat screen televisions and video monitors instead have thin horizontal borders that cover the top of the video screen and associated electronics located behind the screen.

There is accordingly a need for a stand or shelf that provides a flat horizontal surface along the top of a flat screen device, such as, televisions, computer monitors, video monitors and the like. As is known, flat screens can be stand-supported or be wall mounted. There is a need accordingly for a stand or shelf that provides a flat horizontal surface along the top of either a stand-supported or a wall mounted flat screen device.

SUMMARY

The present disclosure provides a support assembly that forms a flat horizontal supporting surface along the top of any flat screen device, such as, televisions, computer monitors, video monitors and the like. The support assembly includes a stand that extends horizontally at the top of the flat screen devices. The user can place one or more objects on the stand, such as speaker or other electronic device, remote control, picture, ornament, book, supply, plants etc. The stand includes mounting holes that enable the stand to be connected to one or more mount. The mount includes a mounting flange and a ratchet base extending perpendicularly from the mounting flange. The mounting flange includes mounting holes that match the hole pattern formed in the stand. The ratchet base includes, defines, connects to or mates with a ratchet ring.

The support assembly also includes an arm that is placed in ratcheted communication with the ratchet ring of the mount. The arm includes a circular base and a member that extends from the circular base. The circular base includes, defines, connects to or mates with a second ratchet ring. The ratchet ring of the arm is placed in ratchet communication with the ratchet ring of the mount. The circular base includes or defines a hole that allows a torque screw or fastener to fit through the arm and connect to the mount to secure the two ratchet rings together, so that the arm extends at a desired angle relative to the stand. The torque screw can thread into the mount or extend through the mount and thread into a nut or threaded bracket placed on the opposite side of the mount from its ratchet ring.

The user rotates the arm to a desired angle relative to the stand and then tightens the fastener or torque screw so that the two ratchet rings lock together. The desired angle causes the stand of the assembly to sit horizontally on top of the flat screen device. A spring is compressed when the ratchet rings lock together to maintain tension on the ratcheted connection. The stand at its front end includes a downwardly bent flange that catches the top front bezel of the flat screen device when the arm contacts the rear of the flat screen device. Rotating the arm to an angle α more away from being straight down (270°) causes the rear end of the stand to sit elevationally higher. Rotating the arm to an angle α closer to being straight down (270°) causes the rear end of the stand to sit at an elevationally lower position. The ratchet rings provide a high degree of adjustability, allowing the user to select an angle α that allows the stand to reside at least substantially horizontally at the top of the flat screen device.

The arm at its distal end includes a cap that abuts against the back of the flat screen device when the support assembly is placed on top of the flat screen device.

The support assembly in one embodiment provides a quick disconnect/reconnect feature in the form of a cammed lever. The cammed lever includes a dual-lobed cammed head and a handle arm extending integrally from, formed with, or attached to the cammed head. The dual lobes of cammed head each define a circular aperture that receives a cylindrical female threaded nut. The threaded nut receives a male threaded stud of the torque or fastener between the lobes of the cammed head. The dual lobes of cammed head each have a larger radius in a locking direction and a smaller radius in a loosening direct. The user turns the handle arm of the cammed lever in a first direction so that the smaller radius faces the elongated arm of the support assembly, loosening the ratchet rings, and allowing the elongated arm to be set to a desired angle α. The user then turns the handle arm of the cammed lever in the opposite direction, so that the larger radius faces the elongated arm of the support assembly, tightening the ratchet rings together, and locking the elongated arm at the desired angle α.

The assembly can employ one, two or more ratcheted arms to provide whatever support is needed. Using two or more ratcheted arms allows for the stand to be elongated to support multiple objects, or a single elongated object, such as a sound bar. The topper is easy to install and adjust. The parts making up the support assembly can be made of any combination of metal, plastic, rubber or wood. The parts can be machined or molded. For example, the ratchet rings can be molded plastic pieces that abut up against the mount and the arm, respectively.

It is therefore an advantage of the present disclosure to provide a support assembly that forms a flat horizontal supporting surface along the top of any flat screen device, such as, televisions, computer monitors, video monitors and the like.

It is another advantage of the present disclosure to provide a support assembly that forms a flat horizontal surface along the top of a self-supported or wall mounted flat screen device.

It is a further advantage of the present disclosure to provide a support assembly that forms a flat horizontal surface along the top of a flat screen device, and which is adjustable without the use of external tools.

It is yet another advantage of the present disclosure to provide a support assembly having a quick disconnect/reconnect feature.

Moreover, it is an advantage of the present disclosure to provide a support assembly that forms a flat horizontal surface along the top of a flat screen device, and which is easy to install.

Further still, it is an advantage of the present disclosure to provide a support assembly that forms a flat horizontal surface along the top of a flat screen device, and which is sturdy and can support a reasonable amount of weight.

Still further, it is an advantage of the present disclosure to provide a support assembly that forms a flat horizontal surface along the top of a flat screen device, and which is highly adjustable Additional features and advantages of the present invention are described in, and will be apparent from, the following Detailed Description of the Invention and the figures.

BRIEF DESCRIPTION OF THE FIGURES

FIG. 5 is a perspective view illustrating one embodiment of the support assembly being used with a flat screen device.

FIG. 6 is a perspective view illustrating another embodiment of the support assembly being used with a flat screen device.

DETAILED DESCRIPTION

Figure 1:
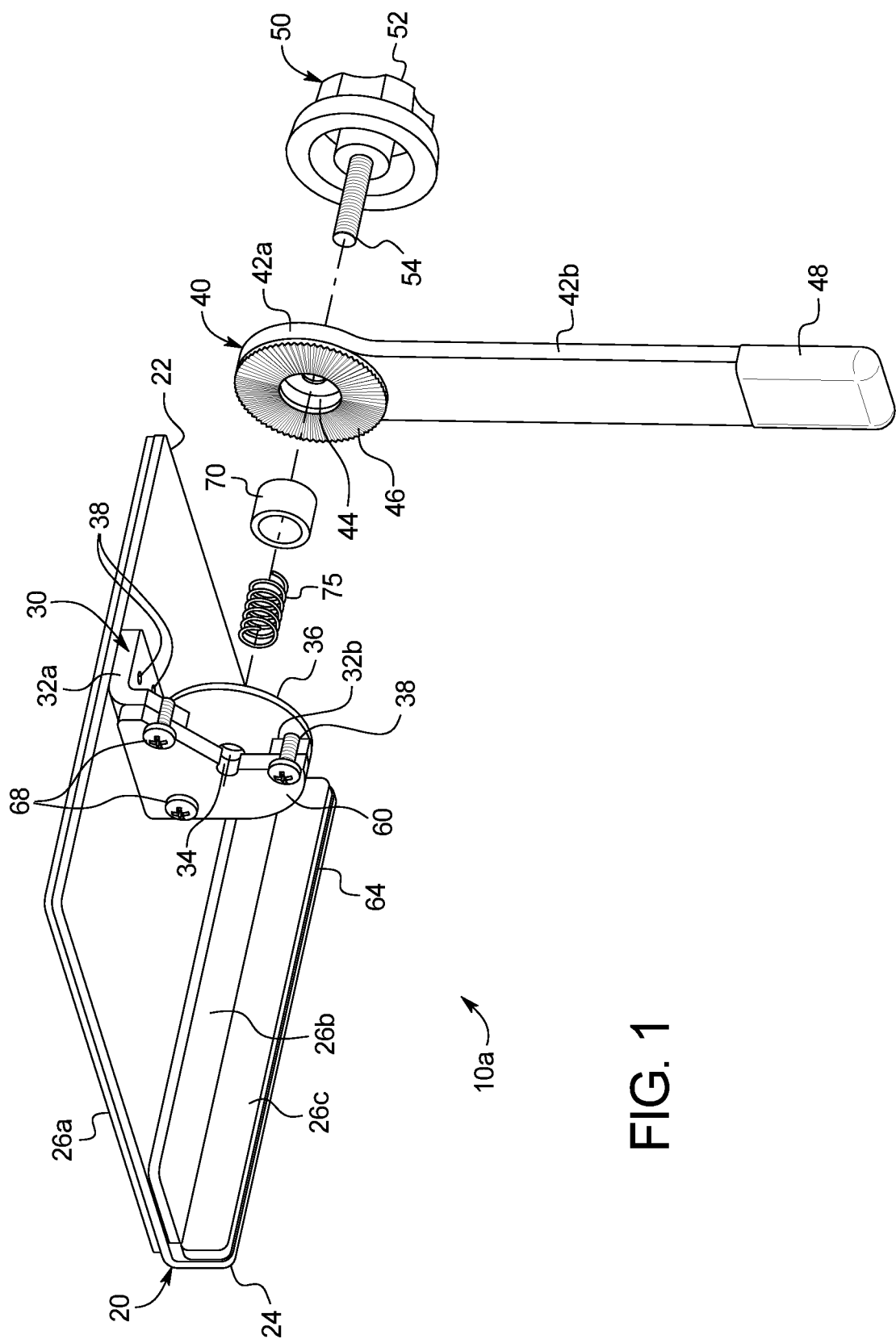
FIG. 1 is an exploded perspective view of one embodiment of a support assembly of the present disclosure.

Referring now to the drawings and in particular to FIGS. 1 to 4, one embodiment for a support assembly 10a is illustrated. Support assembly 10a in the illustrated embodiment includes a stand 20, a mount 30 connected to stand 20, an arm 40 that is placed in ratcheted communication with mount 30, a fastener or torque screw 50 for selectively tightening and loosening arm 40 to mount 30, and a bracket 60 for threadingly engaging torque screw 50. Each of stand 20, mount 30, arm 40, torque screw 50 and bracket 60 can be made of metal (e.g., steel, stainless steel, aluminum), plastic (e.g., polypropylene, polyethylene, polycarbonate), rubber, wood, composite materials, and any combination thereof.

Stand 20 includes a top plate 22 and a front flange 24 extending from or connected to top plate 22. Top plate 22 and front flange 24 can be for example about 0.125 inch (3.2 mm) thick or thicker if desired. Front flange 24 is placed in front of the flat screen device, such as, a television, computer monitor, video monitor, etc. Front flange 24 accordingly does not extend too far downwardly, so as not to block the viewing of the image displayed on the flat screen device. Top plate 22 in one embodiment is six inches (15.2 cm) wide (dimension extending along top of the flat screen device) and 5.5 inches (14.0 cm) deep (dimension extending from back of the flat screen device). Top plate 22 can have different widths and depths, e.g., can have a twelve inch (30.4 cm) double width and two or more ratcheting subassemblies to support the larger width as illustrated below.

Top plate 22 and front flange 24 are metal or plastic in one embodiment and are provided respectively with top surface padding 26a, bottom surface padding 26b and inner flange surface padding 26c. Padding 26a, 26b, and 26c can be a softer metal, plastic, covered foam, covered sponge, rubber, foam rubber, wood, or combinations thereof. In an embodiment padding 26a, 26b and 26c is adhered to, heat sealed to, sprayed onto and/or mechanically attached to the respective mating surfaces of top plate 22 and front flange 24. Padding 26a, 26b, and 26c helps to prevent scratching of the flat screen device. Padding 26a, 26b, and 26c also helps to prevent objects set onto top plate 22 from scratching the top plate, and may also help to prevent the objects from slipping.

Figure 4:
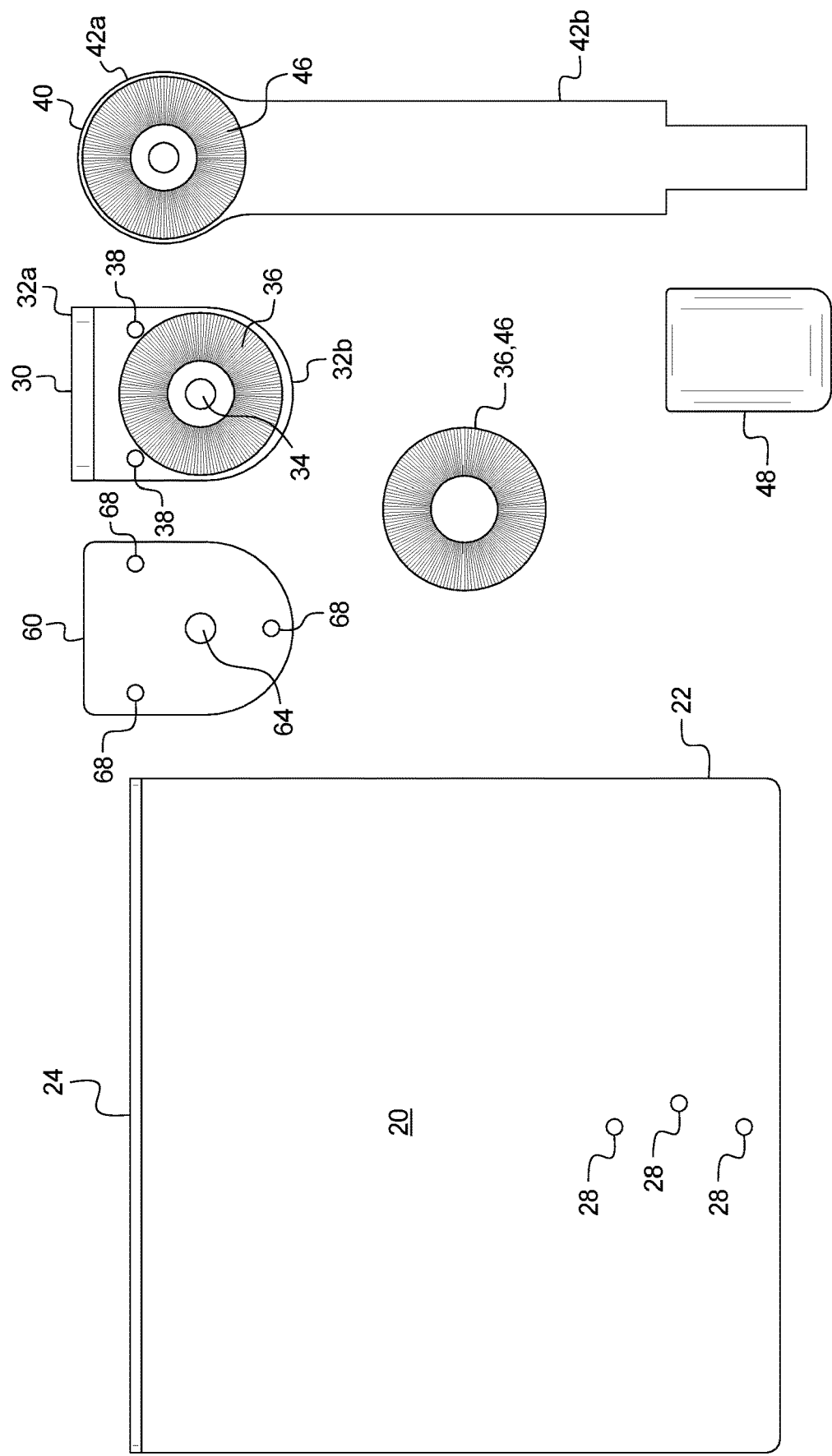
FIG. 4 illustrates various loose parts of one embodiment for the support assembly of the present disclosure.

FIG. 4 illustrates that stand 20 includes or defines mounting holes 28. The illustrated embodiment shows three holes, wherein the middle hole is offset from the outer mounting holes, which helps to prevent mount 30 from pivoting under load in any direction relative to stand 20. Stand 20 can have alternative numbers and configurations for mounting holes 28, and have additional holes, e.g., for routing electrical cords and wires.

Mount 30 includes a mounting flange 32a and a ratchet base 32b. In one embodiment mounting flange 32a and ratchet base 32b are bent or formed from the same piece of metal or plastic forming mount 30. In another embodiment, mounting flange 32a and ratchet base 32b are separate pieces that are secured together, e.g., via welding, adhesive, and/or via mechanical securement. Mounting flange 32a and ratchet base 32b can be made of a thicker material than for stand 20, e.g., on the order of 0.125 inch (3.2 mm) thick to 0.375 inch (9.5 mm) thick.

Ratchet base 32b includes or defines a center hole 34 for receiving the threaded stud 54 of torque screw 50 or fastener. Center hole 34 can be a through-hole sized to allow the threaded stud 54 of torque screw 50 to pass through. Center hole 34 can alternatively be female threaded to threadingly engage the male threads of the threaded stud 54 of torque screw 50.

Ratchet base 32b also includes, defines or attaches to a circular set of ratchets 36, which engage mating ratchets of arm 40. Individual ratchets 36 have a triangular cross-section in one embodiment and are disposed radially about a center point to form a circle or ring. Ratchets 36 extend outwardly from a base portion of ratchet base 32b in a same direction as the direction in which mounting flange 32a extends from ratchet base 32b of mount 30.

In one embodiment, ratchets 36 or ratchet ring 36 is a separate plastic or metal piece that abuts up against ratchet base 32b of mount 30. For example, separate ratchet ring 36 can be a molded plastic piece made of any of the plastics listed above, or of a tougher plastic, such as Teflon. In another embodiment, ratchets 36 or ratchet ring 36 is formed with ratchet base 32b and mount 30. For example, ratchet ring 36 can be machined from the same piece of metal with ratchet base 32b to form mount 30. Or, ratchet ring 36 can be formed from the same plastic mold as ratchet base 32b to form mount 30. FIG. 4 illustrates ratchet ring 36 both as a separate, stand alone, piece and as formed with ratchet base 32b.

Mounting flange 32a and ratchet base 32b of mount 30 each define mounting holes 38, and in the illustrated embodiment, define three mounting holes 38. The mounting holes 38 of mounting flange 32a (illustrated best in FIGS. 1 and 2) are spaced apart so as to match mounting holes 28 defined in top plate 22 of stand 20. Mounting holes 38 and mounting holes 28 can each be through holes for receiving bolts that are fastened via separate nuts to tighten mount 30 against stand 20. Alternatively, either mounting holes 38 or mounting holes 28 are threaded to threadingly receive bolts or fasteners to tighten mount 30 against stand 20. In an embodiment, mounting holes 38 are threaded, and the holes of padding 26a that made the holes 28 of stand 20 are enlarged to allow bolt heads sit down into the padding, so that the bolt heads do not reside above padding 26a and interrupt the supporting surface of stand 20. In various alternative embodiments, mount 30 can be permanently welded to or formed with stand 20.

The mounting holes 38 of ratchet base 32b of mount 30 can likewise be either through holes or be threaded. FIG. 4 illustrates that the top two mounting holes 38 of ratchet base 32b extend all the way through ratchet base 32b of leg 32b. If ratchet ring 36 is a separate piece, the bottom mounting hole 38 of mount 30 also extends all the way through ratchet base 32b. If ratchet ring 36 is formed as part of or integrally with mount 30, then bottom hole 38 of mount 30 is a blind hole that does not extend through the integrally formed ratchet ring 36 of mount 30.

If center hole 34 of ratchet base 32b of mount 30 is a through hole, then bracket 60 can be provided, wherein the center hole 62 of bracket 60, which aligns with center hole 34 of mount 30, is threaded to threadingly receive the threaded stud 54 of torque screw or fastener 50. Bracket 60 in turn includes mounting holes 68, which align with the mounting holes 38 of ratchet base 32b. Mounting holes 68 of bracket 60 and mounting holes 38 of ratchet base 32b can both be through holes that accept bolts or fasteners, which in turn threadingly engage nuts to fasten bracket 60 to ratchet base 32b of mount 30. Alternatively, either mounting holes 68 or mounting holes 38 are threaded to threadingly engage bolts or fasteners to fasten bracket 60 to ratchet base 32b of mount 30.

If center hole 34 of ratchet base 32b of mount 30 is a threaded hole, then bracket 60 need not be provided, and thus mounting holes 38 of ratchet base 32b need not be provided. Threaded center hole 34 of ratchet base 32b now receives the threaded stud 54 of torque screw 50. In a further alternative embodiment, center hole 34 of ratchet base 32b of mount 30 is a through hole, and a nut is welded to the side of ratchet base 32b opposite to that of ratchets 36. Here again, bracket 60 and mounting holes 38 ratchet base 32b need not be provided. The welded nut instead receives the threaded stud 54 of torque screw 50.

Figure 2:
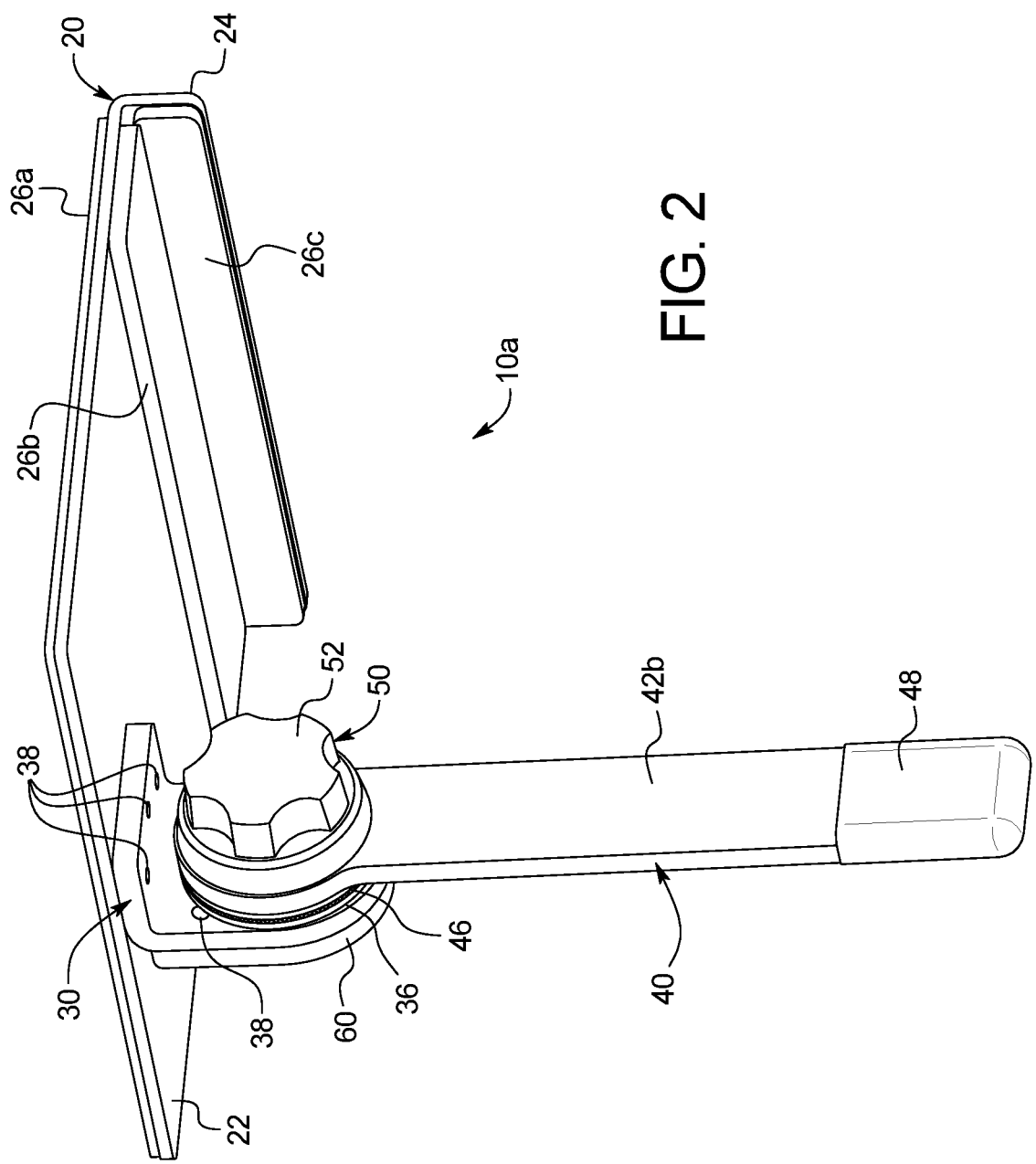
FIG. 2 is an assembled perspective view of one embodiment of a support assembly of the present disclosure.
Figure 3:
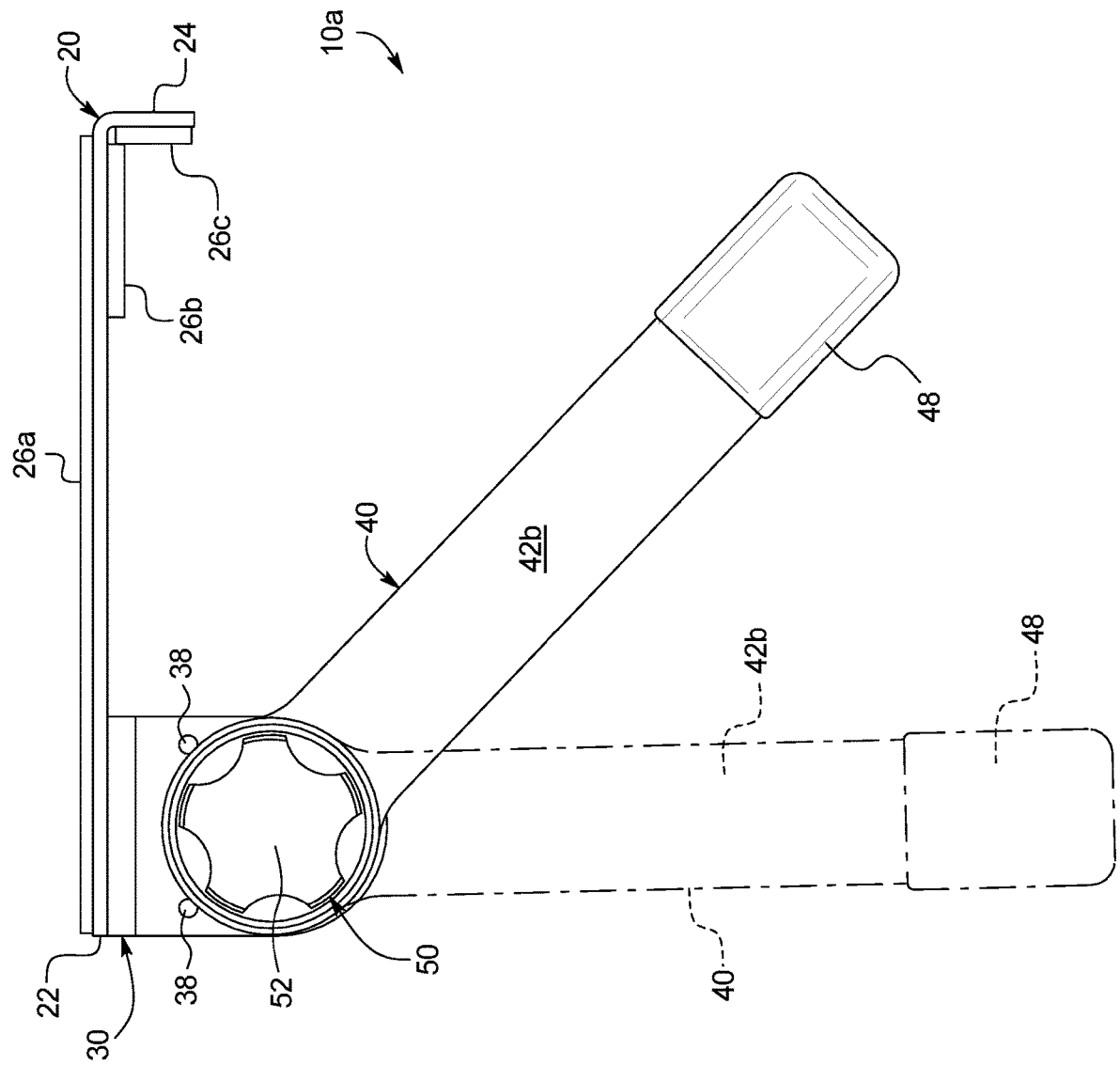
FIG. 3 is a side elevation view of one embodiment of a support assembly of the present disclosure.

Mount 30 mates with arm 40 as illustrated in FIGS. 1 to 3. Arm includes a circular base 42a and a member 42b extending from base 42a. Circular base 42a includes or defines a hole or aperture 44 that receives the threaded stud 54 of torque screw 50. Fastener or torque screw 50 abuts up against the side of circular base 42a that opposes ratchets or ratchet ring 46.

Just like with ratchets 36 or ratchet ring 36 of mount 30, in one embodiment, ratchets 46 or ratchet ring 46 of arm 40 is a separate plastic or metal piece that abuts up against base 42a of arm 40. For example, separate ratchet ring 46 can be a molded plastic piece made of any of the plastics listed above, or of a tougher plastic, such as Teflon. Separate ratchets 36 and 46 can be the same pieces so that they mate together properly. In another embodiment, ratchets 46 or ratchet ring 46 is formed with base 42a and arm 40. For example, ratchet ring 46 can be machined from the same piece of metal with base 42a to form arm 40. Or, ratchet ring 46 can be formed from the same plastic mold as base 42a to form arm 40. Integrally formed ratchets 36 and 46 can have the same size and number of individual ratchet peaks, so that they mate together properly. FIG. 4 illustrates ratchet ring 46 both as a separate, stand alone piece and as formed with circular base 42b.

Ratchets 36 and 46 provide support assembly 10a with a large amount of adjustability. The user simply turns arm 40 until ratchets 36 and 46 align at an angle, such that top plate 22 is relatively horizontal when the distal end of member 42 abuts the flat screen device.

Member 42b extends from base 42a a distance, such that the total length of arm 40 is longer than the depth of top plate 22 in one embodiment, which is illustrated in FIG. 3. That is, if top plate 22 is 5.5 inches (14.0 cm) deep (dimension extending from the back of the flat screen device), then the total length of arm 40 can be 6 inches (15.2 cm) or longer. The length of member 42b is the total length of arm 40 less the diameter of circular base 42a. FIG. 3 illustrates that member 42b can rotate to virtually any desired angle about hole or aperture 44 and threaded stud 54.

Arm 40, (including member 42b), like mounting flange 32a and ratchet base 32b of mount 30, can be made of a thicker material, e.g., on the order of 0.125 inch (3.2 mm) thick to 0.375 inch (9.5 mm) thick. Member 42b is substantially straight in the illustrated embodiment, but can have a slight taper, such that member 42b narrows as it extends from circular base 42a to its distal end. As illustrated in FIG. 4, the distal end of member 42b can also be reduced in size to accommodate a soft cap 48, such as a rubber (e.g., silicone) or plastic cap (e.g., a softer plastic), so that arm 40 will not scrape or scratch the flat screen device when abutted against the device. Soft cap 48 can be press-fitted, adhered, and/or fastened mechanically to the distal end of member 42b.

Fastener or torque screw 50 includes a knob or handle 52 connected to or formed with a threaded stud 54 discussed above. Handle 52 and stud 54 can each be any of the metals or plastics discussed herein, or combinations thereof. For example, handle can be polycarbonate, while stud 54 can be steel, stainless steel or aluminum. Handle 52 can be knurled or have finger extensions and undulations, as illustrated in FIGS. 1 to 3. Threaded stud 54 can be of a relatively robust diameter, e.g., 0.25 inch (6.4 mm) to 0.500 inch (12.7 mm) or of a standard metric equivalent thread diameter, e.g., 6 mm, 7 mm, 8 mm, 9 mm, 10 mm, 11 mm, 12 mm or 13 mm. The female thread of hole 34 or 64 is sized to match the male thread diameter and pitch of threaded stud 54.

FIG. 1 illustrates that a collar 70, and a spring 75 located within collar 70, are in turn located within openings 34 and/or 44 of ratchet base 32b of mount 30 and/or base 42a of arm 40, respectively. In an embodiment, collar 70 and spring 75 are located solely within opening 44 in base 42a of arm 40. Collar 70 can be metal or plastic, such as Teflon. Spring 75 is sized so that it (i) holds ratchet rings 36 and 46 apart when fastener or torque screw 50 is loosened, and (ii) provides a lock washer biasing effect when torque screw 50 is tightened so that arm 40 is pressed firm and in a desired angular position against mount 30. Spring 75 is also sized so that it is not too difficult for the user to compress the spring when tightening torque screw 50.

Referring now to FIGS. 5 and 6, examples of support assembly 10*a* in use are illustrated. FIG. 5 illustrates that front flange 24 and support pad 26*c* are abutted against the top, front horizontal bezel 82 of flat screen device 80, e.g., flat screen television, flat screen computer monitor, flat screen video monitor and the like, while free end or cap 48 of arm 40 engages a rear surface of flat screen device 80. Front flange 24 is sized so as not to extend down over a screen 84 of flat screen device 80. Member 42*b* of arm 40 is rotated from a straight vertical position (270°) to a desired position or angle α (about 245° in the illustrated example), so that top plate 22 of stand 20 resides at least substantially horizontally relative to flat screen device 80. At the desired angle, the user locks ratchet 46 against ratchet 36, using torque screw or fastener 50. The user can later unscrew fastener 50 to set support assembly 10*a* at a difference angle for a different device 80, or disassemble support assembly 10*a*, e.g., for transport.

It should be appreciated that rotating member 42*b* of arm 40 towards the straight vertical position (270°) would lower the rear end 29 of top plate 22 relative to the top of flat screen device 80 in FIG. 5. Rotating member 42*b* of arm 40 further away from the straight vertical position (270°) in FIG. 5 would raise the rear end 29 of top plate 22 relative to the top of flat screen device 80. Providing ratchet rings 36 and 46 with many individual ratchets or teeth, e.g., seventy-two ratchets or teeth, allows for a fine adjustment of the rear end 29 of top plate 22, so that top plate 22 can be made at least substantially horizontal regardless of the backside configuration of flat screen device 80. Generally, "flatter" backside configurations for devices 80 will require that rotating member 42*b* be rotated further away from the straight vertical position (270°), while bulkier backside configurations for devices 80 will require that rotating member 42*b* be rotated closer to the straight vertical position (270°). In any case, soft cap 48 at the end of arm 40 provides for scratchless contact with flat screen device 80. Soft cap 48 in an embodiment also has a relatively high coefficient of friction, which helps to keep support assembly 10*a* from slipping against flat screen device 80.

FIG. 6 illustrates an object 90 placed on top plate 22 of stand 20. In an embodiment, support assembly 10*a* (and each of the assemblies 10*a* to 10*c* described herein) can support at least twenty lbs. (44 kg). It is expressly contemplated to size top plate 22 so as to support speakers and sound bars, which can be difficult to locate, especially when flat screen device 80 is wall mounted. Also, mounting speakers above a television is advantageous because most of the sound in a television video emanates from the top third of the screen. FIG. 6 illustrates that object 90 has a cord 92 that fits through one of the mounting holes 28 of top plate 22. Here, one of the mounting holes 28 is not used for fastening to mount 30 and instead accepts and directs cord 92 of object 90. Plate 22 alternatively provides one or more hole or aperture (not illustrated), in addition to mounting holes 28, for accepting a cord 92. Further alternatively, rear end 29 of top plate 22 includes or defines one or more clip (not illustrated) for clipping, holding and routing one or more cord 92 of object.

Figure 7:
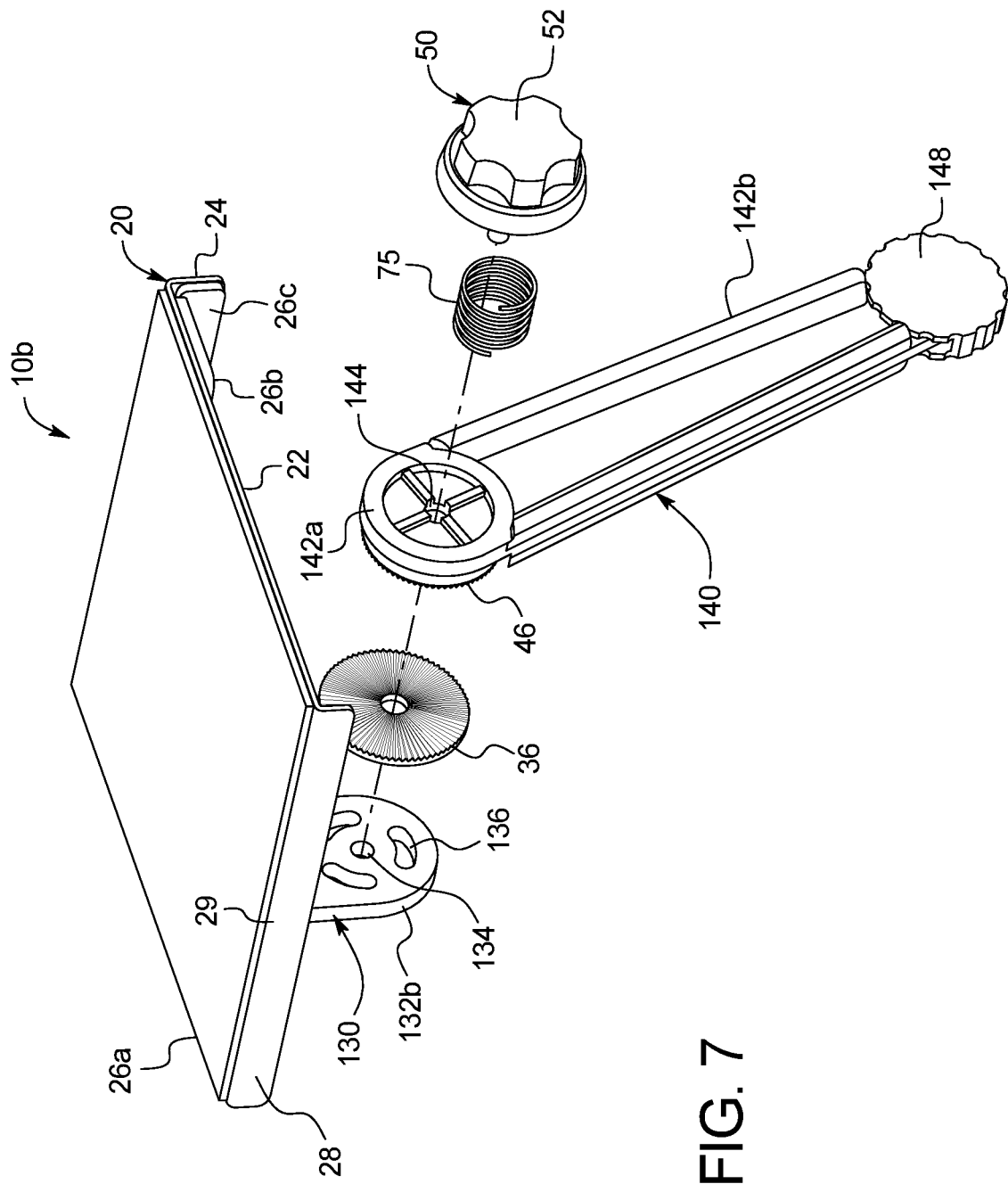
FIG. 7 is an exploded perspective view of another embodiment of a support assembly of the present disclosure.

Referring now to FIG. 7, an alternative support assembly 10*b* is illustrated. Alternative support assembly 10*b* includes many of the same features as support assembly 10*a*, including stand 20, having top plate 22, front flange 24, padding 26*a* to 26*c* and all of the materials, structure and alternatives for same discussed above. Stand 20 of support assembly 10*b* also includes a rear flange 28 located at rear end 29. Rear flange 28 provides additional rigidity to top plate 22 and stand 20. Rear flange 28 can be bent upwardly instead of downwardly as illustrated, so that rear flange 28 also helps to prevent object 90 from sliding off of the rear end of stand 20. Rear flange 28 when bent upwards can also provide notches for holding and routing cords and wires.

Support assembly 10*b* also includes an alternative mount 130 and an alternative arm 140. Alternative mount 130 includes mounting flange 132*a* and ratchet base 132*b*, and includes all of the materials, structure and alternatives for same discussed above for mount 30. Mounting flange 132*a* defines mounting holes as is the case with mounting holes 38 of mounting flange 32 of mount 30. Ratchet base 132*b* defines a threaded hole 134 for receiving torque screw or fastener 50. Threaded bracket 60 (FIG. 1) is accordingly not needed with support assembly 10*b*. If mount 130 is a molded plastic piece, threaded hole 134 can be a metal insert pressed into ratchet base 132*b*, so that the threads do not strip. Ratchet base 132*b* also defines elongated holes or grooves 136 to remove material, weight and cost from support assembly 10*b*. Elongated holes or grooves 136 in an embodiment also accept like shaped extensions (not seen in FIG. 7 but illustrated below in FIG. 9 as extensions 37) extending from the backside of ratchet ring 36, so that ratchet ring 36 fits into ratchet base 132*b* and therefore cannot rotated relative to base 132*b*. Ratchet base 132*b* is illustrated as operating with a separate ratchet ring 36 but can be formed alternatively with or be permanently attached to ratchet ring 36 as discussed above for ratchet base 32*b*.

Alternative arm 140 includes a member 142*b* extending from a circular ratchet base 142*a*, and includes all of the materials, structure and alternatives for same discussed above for arm 40. Circular base 142*a* defines a through-hole 144 for accepting threaded stud 54 of torque screw or fastener 50. Spring 75 fits primarily within knob or handle 52 of torque screw 50. Ratchet ring 46 abuts up against the inner surface of circular base 142*a* and is placed in ratcheted communication with ratchet ring 36 when torque screw 50 is threaded into female threaded hole 134 of mount 130. Ratchet ring 46 can be formed with or be permanently attached to circular base 142*a*. Ratchet ring 46 is alternatively a separate piece, which can have extensions (not seen in FIG. 7 but illustrated below in FIG. 9 as extensions 47) on the surface opposite its ratcheted surface, that fit into mating grooves or holes (not seen in FIG. 7 but illustrated below in FIG. 9 as grooves or holes 246) formed in circular base 142*a*, so that separate ratchet ring 46 fits into and cannot rotate relative to circular base 142*a* of arm 140. Spring 75 acts as a lock washer to hold torque screw 50 tight when ratchet rings 36 and 46 are locked together.

Member 142*b* in the illustrated embodiment has a slight taper, such that member 42*b* narrows as it extends from circular base 142*a* to its distal end. As illustrated in FIG. 7, the distal end of member 142*b* extends to an integrally formed or molded cap 148, which here is shaped as a knurled wheel. Arm 140 can be any of the plastics discussed above, rubber (e.g., silicone), wood, or a metal having rounded edges, so that arm 140 will not scrape or scratch flat screen device 80 when abutted against the device. Cap 148 can alternatively be a separate piece press-fitted, adhered, and/or fastened mechanically to the distal end of member 142b.

Figure 8:
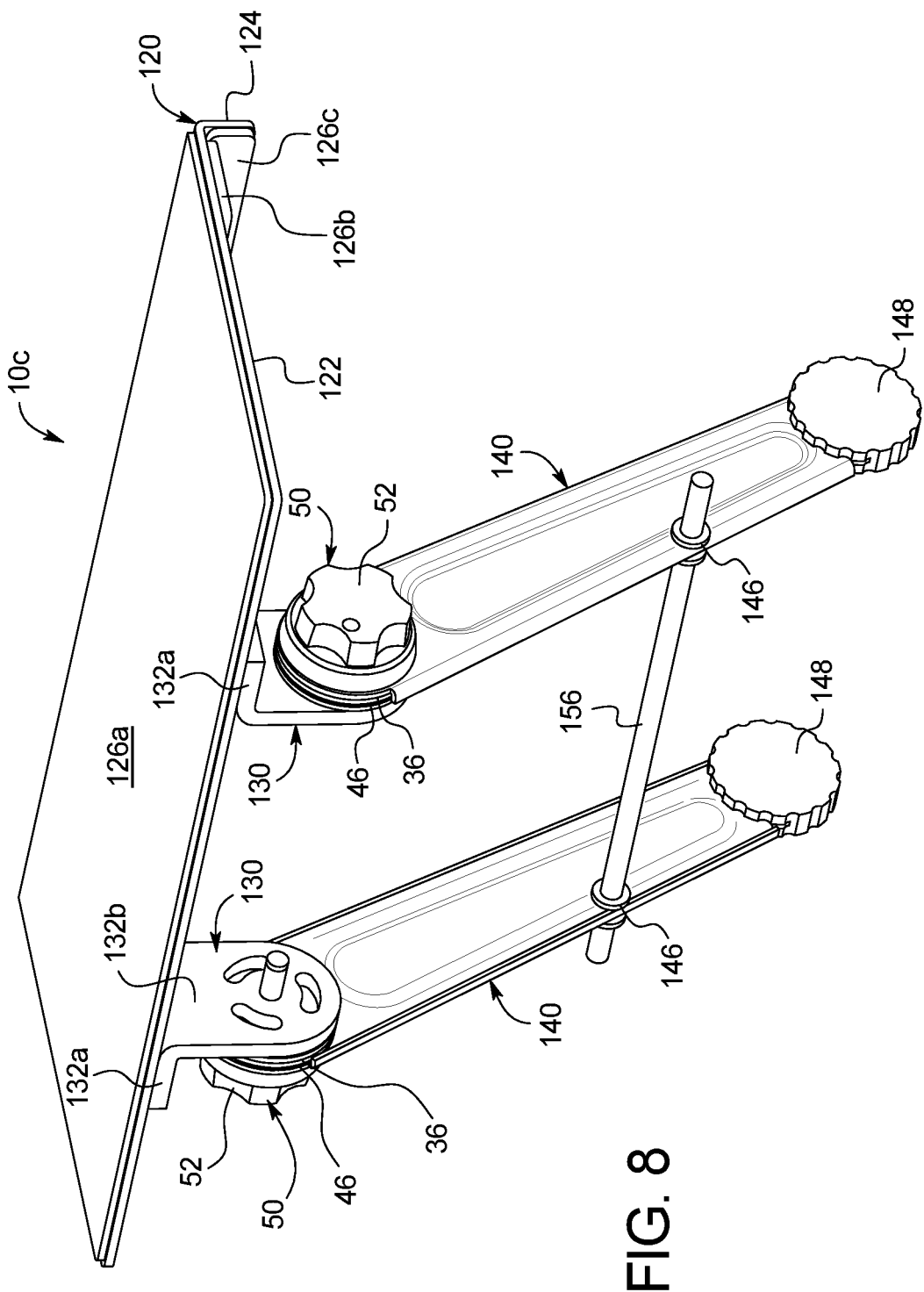
FIG. 8 is an assembled perspective view of a further alternative embodiment of a support assembly of the present disclosure.

FIGS. 1 to 3 and 5 to 7 illustrate single arm versions of assemblies 10a and 10b, wherein the single arms are at least approximately located side-to-side-wise in the center or middle of stand 20, so that assemblies 10a and 10b are inherently balanced side-to-side-wise. Referring now to FIG. 8, an alternative multi-arm support assembly 10c is illustrated. Alternative support assembly 10c includes many of the same features as support assembly 10b, including mounts 130, arms 140, torque screws or fastener 50 and springs 75. Mounts 130, arms 140, torque screws 50 and springs 75 can be made of any of the materials, have any of the structure and any of the alternatives discussed above in connection with assemblies 10a and 10b. The primary difference between support assembly 10c and assemblies 10a and 10b is that support assembly 10c includes multiple arms 140 and alternative stand 120 having an elongated top plate 122, flange 124, and padding 126a to 126c. Alternative stand 120 can be made of any of the materials, and have any of the structures and alternatives discussed above for stand 20. Although not illustrated, stand 120 can have a rear flange, such as rear flange 28 of stand 20 of support assembly 10b.

Elongated stand 120 is supported by two or more arms 140 as illustrated in FIG. 8. Mounts 130 can be alternated as illustrated, so that mounting flanges 132a always point outwards towards the closer of the side edges of stand 120. In one alternative embodiment, a connecting rod 156 is releaseably secured within holes or slots 146 formed in members 142b of arms. Connecting rod 156 allows a user to rotate two or more arms 140 and associated ratchets 46 at one time to a desired angle relative to fixed ratchets 36. Alternatively, connecting rod 156 is not provided and the user instead rotates members 142 individually to the same desired angle α, where ratchet rings 46 can then be tightened against ratchet rings 136. In any case, multiple arms support elongated stand 120, which can be sized for flat screen devices 80 up to eighty-five inches (216 cm) or more. Elongated stand 120 can support multiple objects 90 or an elongated object 90, such as a sound bar.

Figure 9:
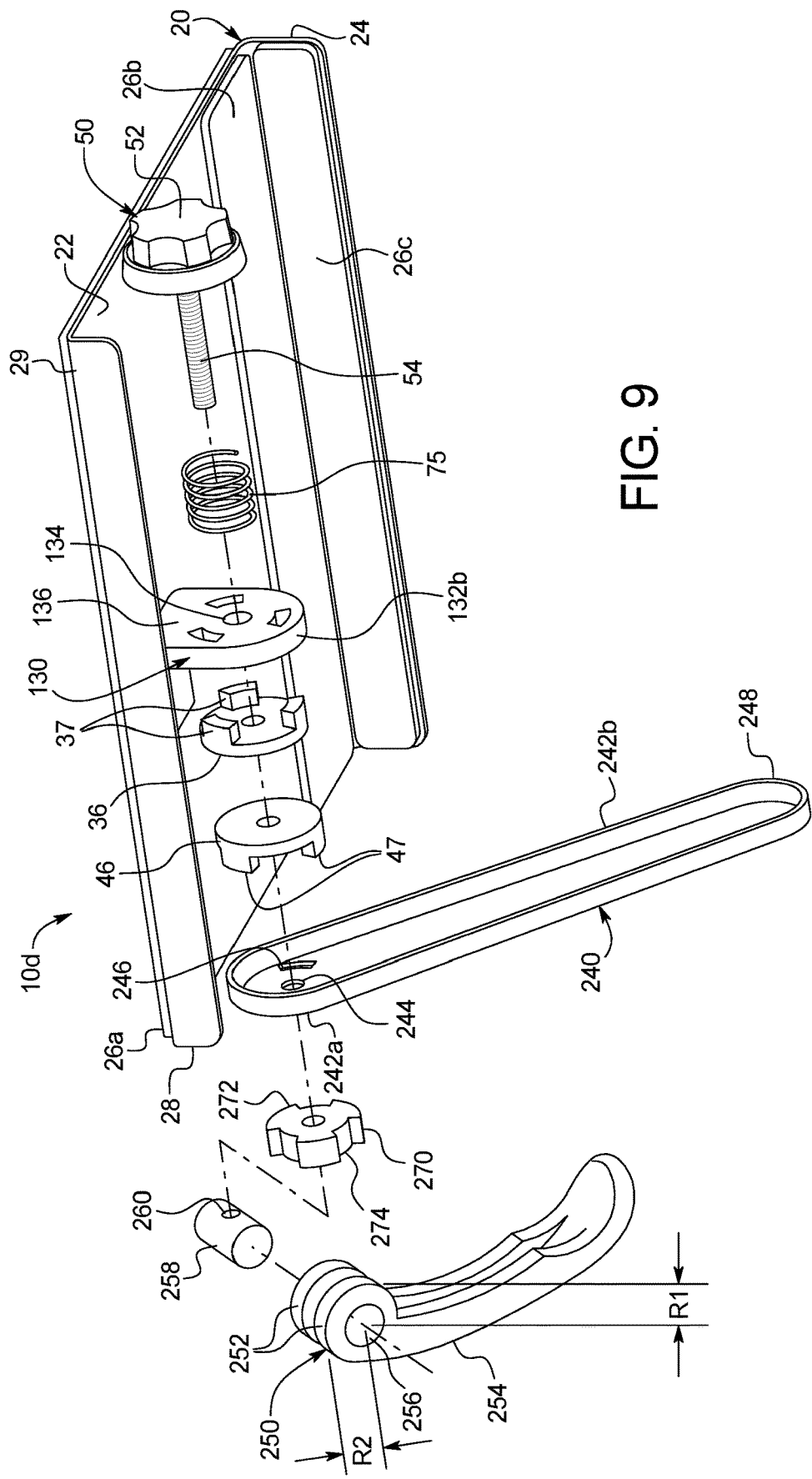
FIG. 9 is an exploded perspective view of yet a further embodiment of a support assembly of the present disclosure.

Referring now to FIG. 9, a further alternative support assembly 10d is illustrated. Alternative support assembly 10d includes many of the same features as support assembly 10b (and 10a), including stand 20, having top plate 22, front flange 24, padding 26a to 26c and all of the materials, structure and alternatives for same discussed above. Stand 20 of support assembly 10d also includes rear flange 28 located at rear end 29, providing additional rigidity to top plate 22 and stand 20. Rear flange 28 can again be bent upwardly instead of downwardly as illustrated, so that rear flange 28 also helps to prevent object 90 from sliding off of the rear end of stand 20. Rear flange 28 when bent upwards can also provide notches for holding and routing cords and wires.

Support assembly 10d also includes mount 130 and an alternative arm 240. Mount 130 includes mounting flange 132a (not visible in FIG. 9) and ratchet base 132b, and includes all of the materials, structure and alternatives for same discussed above for mount 30. Mounting flange 132a defines mounting holes as is the case with mounting holes 38 of mounting flange 32 of mount 30. Ratchet base 132b here defines a through hole 134 for allowing threaded stud 54 of torque screw or fastener 50 to pass through ratchet base 132b. Threaded bracket 60 (FIG. 1) is not needed with support assembly 10d. Ratchet base 132b also defines elongated holes or grooves 136 to remove material, weight and cost from support assembly 10b. Elongated holes or grooves 136 in an embodiment also accept like shaped extensions 37 extending from the backside of ratchet ring 36, so that ratchet ring 36 fits into ratchet base 132b and therefore cannot rotated relative to base 132b. Ratchet base 132b is illustrated as operating with a separate ratchet ring 36 but can be formed alternatively with or be permanently attached to ratchet ring 36 as discussed above for ratchet base 32b.

Alternative arm 240 includes a member 242b extending from a circular ratchet base 242a, and includes all of the materials, structure and alternatives for same discussed above for arms 40 and 140. Circular base 242a defines a through-hole 244 for accepting threaded stud 54 of torque screw or fastener 50. Spring 75 again fits primarily within knob or handle 52 of torque screw 50. Ratchet ring 46 abuts up against the inner surface of circular base 242a and is placed in ratcheted communication with ratchet ring 36 when torque screw 50 is threaded into a cammed lever 250 discussed in more detail below. Ratchet ring 46 can be formed with or be permanently attached to circular base 242a. Ratchet ring 46 is alternatively a separate piece, which can have extensions 47 on the surface opposite its ratcheted surface, that fit into mating grooves or holes 246 formed in circular base 242a, so that separate ratchet ring 46 fits into and cannot rotate relative to circular base 242a of arm 240. Spring 75 again acts as a lock washer to hold torque screw 50 and cammed lever 250 tight together, while ratchet rings 36 and 46 are locked together.

Member 242b can again have a slight taper, such that member 242b narrows as it extends from circular base 242a to its distal end. As illustrated in FIG. 9, the distal end of member 242b extends to an integrally formed or molded cap 248. Member 242b and cap 248 as illustrated have or include 90° bent or formed flanges, increasing rigidity. Arm 240 can be any of the plastics discussed above, rubber (e.g., silicone), wood, or a metal having bent or formed flanges, and be smooth so that arm 240 will not scrape or scratch flat screen device 80 when abutted against the device. Cap 248 can alternatively be a separate, soft piece press-fitted, adhered, and/or fastened mechanically to the distal end of member 242b to further reduce scratching.

The primary difference with support assembly 10d of FIG. 9 is the addition of cammed lever 250. Cammed lever 250, including any of its components, can be made of any of the plastics discussed above, rubber (e.g., silicone), wood, or any of the metals discussed above, such as steel, stainless steel or aluminum. Lever 250 includes a dual-lobed cammed head 252 and a handle arm 254 extending integrally from, formed with, or attached to cammed head 252. The dual lobes of cammed head 252 each define a circular aperture 256. Circular apertures 256 of the dual lobes of cammed head 252 are aligned with each other.

The dual lobes of head 252 are cammed such that radius R1 illustrated in FIG. 9 is greater than radius R2. For example, radius R1 can be 5% to 50% greater than radius R2. Cammed lever 250 includes a cylindrical nut 258 that fits within circular apertures 256 defined by the dual lobes of head 252. Cylindrical nut 258 defines a female threaded hole 260 that threadingly receives threaded stud 54 of torque screw or fastener 50. Threaded hole 260 is placed in the longitudinal center of cylindrical nut 258, so that threaded hole 260 resides between the dual lobes of head 252 when cylindrical nut 258 is fully fitted into circular apertures 256 defined by the dual lobes of head 252. In this manner, threaded stud 54 can reach threaded hole 260 while cylindrical nut 258 is fully fitted into the dual lobes of head 252.

A collar 270 is fitted between arm 240 and head 252 of cammed lever 250. Collar 270 can be made of any material discussed herein, e.g., any of the plastics discussed above, rubber (e.g., silicone), wood, or any of the metals discussed above, such as steel, stainless steel or aluminum. Collar 270 defines a through hole 272 through which threaded stud 54 of torque screw or fastener 50 extends to reach threaded hole 260 of cylindrical nut 258. Collar 270 defines plural notches 274 on its side abutting arm 240, which receive extensions 47 of ratchet ring 46 that extend through mating grooves or holes 246 formed in circular base 242a, so that collar 270 cannot rotate when torque screw or fastener 50 is threaded into threaded hole 260 of cylindrical nut 258 of cammed lever 250.

Collar 270 on its side opposite that of notches 274 defines a curved or rounded surface 276 that matingly receives the dual lobes of head 252. When handle arm 254 of cammed lever 250 is pointing at least substantially vertically downwardly as illustrated in FIG. 9, cammed lever 250 is in its locked or tightened position. In the tightened or locked position of FIG. 9, larger radius R1 is abutted against curved or rounded surface 276. The larger radius R1 pulls threaded hole 260 of cylindrical nut 258 away from collar 70, arm 240, ratchet rings 36 and 46, and mount 130, pulling handle 52 of torque screw or fastener 50 firmly against mount 130, and locking ratchet rings 36 and 46 together.

When the user turns handle arm 254 ninety degrees clockwise in FIG. 9, the dual lobes of head 252 transition from the first, larger radius R1 to instead the second, smaller radius R2 being abutted against curved or rounded surface 276. Smaller radius R2 pushes threaded hole 260 of cylindrical nut 258 towards collar 70, arm 240, ratchet rings 36 and 46, and mount 130, overcoming spring 75 and pushing handle 52 of torque screw or fastener 50 away from mount 130, so that ratchet rings 36 and 46 can be separated, allowing the user to rotate ratchet ring 46 and thus arm 240 relative to mount 130 and stand 20. Cammed lever 250 in this manner provides support assembly 10d with a quick disconnect/reconnect mechanism, which provides the user with mechanical advantage via handle arm 254 to quickly, via a ninety degree turn, loosen ratchet rings 36 and 46, reset ratchet ring 46 and arm 240 to a new, desired position, and to quickly, via a reverse ninety degree turn, tighten ratchet rings 36 and 46 together, locking arm 240 in the desired position.

The user can alternatively or additionally loosen and tighten ratchet rings 36 and 46 via torque screw or fastener 50 of support assembly 10d as has been described herein. Alternatively, cammed lever 250 in essence replaces torque screw or fastener 50. Instead, a bolt or threaded rod with a nut, such as a lock nut, is inserted through aperture 134 of ratchet base 132b of mount 130 (or aperture 34 of ratchet base 32b of mount 30). The bolt or threaded rod extends further through ratchet rings 36 and 46 and arm 40, 140, 240 and into cylindrical nut 258, where the bolt or threaded rod mates threadingly with threaded hole 260 of nut 258. Here, spring 75 may also be omitted. In any of the cammed lever 250 embodiments, collar 270 may be omitted. That is, the cammed dual lobes of head 252 can instead abut directly up against elongated arm 40, 140, 240 or against a flat washer located between the cammed dual lobes of head 252 and arm 40, 140, 240.

It should be understood that while flat screen devices are one primary use for support assemblies 10a to 10d, the support assemblies described herein can be used instead with any relatively thin and flat vertical structure. For example, it is expressly contemplated to use support assemblies 10a to 10c in the workplace with cubicle walls. In many instances, cubicle space is at a premium. Support assemblies 10a to 10c provide the worker with additional room for books, pictures, plants, supplies, etc.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A support assembly comprising:
  a stand including an underside surface configured to be placed on top of a flat screen device and an upper surface configured to support at least one object;
  a mount located on the underside surface of the stand, the mount providing at least one hole or groove;
  a first set of ratchets including at least one extension sized to be inserted into the at least one hole or groove;
  an arm presenting a second set of ratchets; and
  a fastener positioned and arranged to connect the arm to the mount, wherein (i) the at least one extension is inserted into the at least one hole or groove and (ii) the first set of ratchets engages the second set of ratchets, setting the arm at an angle so that a free end of the arm is able to engage the flat screen device while the stand extends at least substantially horizontally from the top of the flat screen device.

2. The support assembly of claim 1, wherein the stand includes a front flange that engages a front surface of the flat screen device, while the free end of the arm engages a rear surface of the flat screen device.

3. The support assembly of claim 1, wherein the second set of ratchets is formed integrally with the arm.

4. The support assembly of claim 1, wherein at least one of (i) the at least one extension inserted into the at least one hole or groove prevents the first set of ratchets from rotating relative to the mount, or (ii) the at least one extension is shaped at least substantially the same as the at least one hole or groove.

5. The support assembly of claim 1, wherein the mount is formed with the stand or mounted to the stand.

6. The support assembly of claim 1, which includes a spring located between the mount and the arm to help lock the first set of ratchets to the second set of ratchets.

7. The support assembly of claim 1, wherein the first set of ratchets and the second set of ratchets each include a plurality of radially disposed ratchets.

8. The support assembly of claim 1, wherein the fastener is a threaded fastener.

9. The support assembly of claim 1, wherein the mount, arm and fastener are a first mount, first arm and first fastener, and which includes a second mount located on the underside surface of the stand, a second arm, and a second fastener positioned and arranged to mechanically connect the second arm to the second mount.

10. The support assembly of claim 1, wherein the at least one hole or groove includes a plurality of holes or grooves that are radially offset from one another and the at least one extension includes a plurality of extensions that are correspondingly radially offset from one another.

11. The support assembly of claim 1, wherein the at least one hole or groove is arch-shaped and the at least one extension is correspondingly arch-shaped.

12. A support assembly comprising:
  a stand including an underside surface for placement on top of a flat screen device and an upper surface for supporting at least one object;
  a mount located on the underside surface of the stand, the mount providing at least one hole or groove;
  a first set of ratchets including at least one extension sized to be inserted into the at least one hole or groove;
  an arm presenting a second set of ratchets; and
  a fastener positioned and arranged to connect the arm to the mount, wherein (i) the at least one extension is inserted into the at least one hole or groove and (ii) the first set of ratchets engages the second set of ratchets, setting the arm at an angle so that a free end of the arm is able to engage the flat screen device while the stand extends from the flat screen device for supporting the at least one object.

13. The support assembly of claim 12, wherein the second set of ratchets is formed integrally with the arm.

14. A support assembly comprising:
  a stand including an underside surface for placement on top of a flat screen device and an upper surface for supporting at least one object;
  at least one mount located on the underside surface of the stand, the mount providing at least one hole or groove;
  a first arm rotatably mounted to the at least one mount;
  a second arm rotatably mounted to the at least one mount, wherein at least one of the first or second arms is able to be mounted to the at least one mount via at least one extension sized to be inserted into the at least one hole or groove; and
  at least one fastener positioned and arranged to connect the first and second arms to the at least one mount, setting the first and second arms at least substantially at a same angle, so that free ends of the first and second arms are able to engage the flat screen device while the stand extends from the top of the flat screen device for supporting the at least one object.

15. The support assembly of claim 14, which includes at least one of a first biasing device biasing the first arm against the at least one mount or a second biasing device biasing the second arm against the at least one mount.

16. The support assembly of claim 15, wherein the at least one first or second biasing device is at least one of (i) a compression spring or (ii) disposed about a shaft of the at least one fastener.

17. The support assembly of claim 14, wherein the at least one mount is formed with the stand or attached to the stand.

18. The support assembly of claim 14, wherein the at least one fastener is a threaded fastener.

19. The support assembly of claim 14, wherein the first and second arms are rotatable independently of one another.

20. The support assembly of claim 14, wherein the at least one mount presents a first set of ratchets and the first arm presents a second set of ratchets that engage with the first set of ratchets when the first arm is connected to the at least one mount.

21. The support assembly of claim 20, wherein at least one of (i) the first set of ratchets is formed with the at least one mount, (ii) the second set of ratchets is formed with the first arm or (iii) the first set of ratchets presents the at least one extension sized to be inserted into the at least one hole or groove.

22. The support assembly of claim 20, wherein the at least one mount presents a third set of ratchets and the second arm presents a fourth set of ratchets that engage with the third set of ratchets when the second arm is connected to the at least one mount.

23. The support assembly of claim 22, wherein at least one of (i) the third set of ratchets is formed with the at least one mount or (ii) the fourth set of ratchets is formed with the second arm.

* * * * *